United States Patent [19]

Hewitt

[11] 4,204,822
[45] May 27, 1980

[54] MOULDING MACHINE
[75] Inventor: Malcolm Hewitt, Aldridge, England
[73] Assignee: British Industrial Plastics Ltd., West Midlands, England
[21] Appl. No.: 952,032
[22] Filed: Oct. 13, 1978

Related U.S. Application Data
[63] Continuation-in-part of Ser. No. 847,184, Oct. 31, 1977, abandoned.

[30] Foreign Application Priority Data
Aug. 24, 1977 [GB] United Kingdom ............... 35479/77

[51] Int. Cl.² .............................................. B30B 15/00
[52] U.S. Cl. .................................... 425/210; 425/153; 425/DIG. 45; 425/DIG. 60
[58] Field of Search ....... 425/151, 153, 210, DIG. 45, 425/DIG. 60, 405 R, 406

[56] References Cited
U.S. PATENT DOCUMENTS

| | | | |
|---|---|---|---|
| 2,415,462 | 2/1947 | Chevy et al. | 425/153 X |
| 2,876,492 | 3/1959 | Frieder | 425/DIG. 60 |
| 3,029,469 | 4/1962 | Moore et al. | 425/33 |
| 3,089,188 | 5/1963 | Hoffmann | 429/DIG. 45 |
| 3,103,698 | 9/1963 | Wollett | 425/DIG. 60 |
| 3,267,517 | 8/1966 | Altermott | 425/DIG. 60 |
| 3,386,133 | 6/1968 | Weiner | 425/153 |
| 3,997,286 | 12/1976 | Gabrys | 425/406 X |
| 3,999,922 | 12/1976 | Shimada | 425/210 |

FOREIGN PATENT DOCUMENTS
854902 11/1960 United Kingdom ..................... 425/153

Primary Examiner—J. Howard Flint, Jr.
Attorney, Agent, or Firm—William A. Drucker

[57] ABSTRACT

A compression moulding press has fixed and moving tool portions, a shroud mounted for sliding movement around and in sealing relation to one of said tool portions towards and into sealing engagement with the other tool portion so as to define with said tool portions a substantially closed chamber enclosing a moulding tool associated with said tool portions, together with actuating means operable to slide said shroud into said sealing engagement and means operable to at least partially evacuate said closed chamber when so defined.

13 Claims, 4 Drawing Figures

FIG. 2
FIG. 3
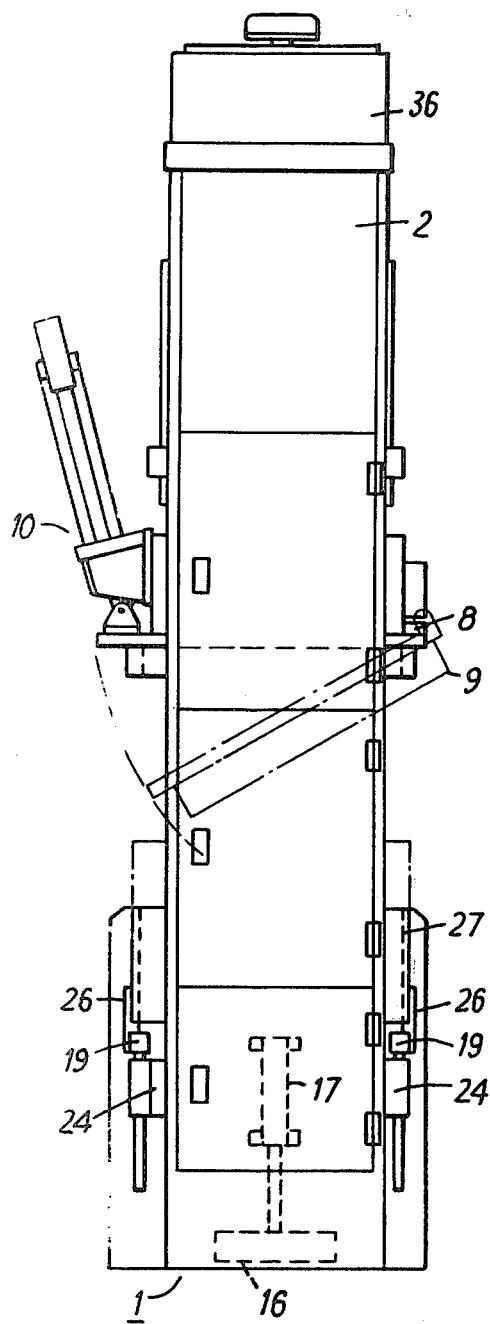
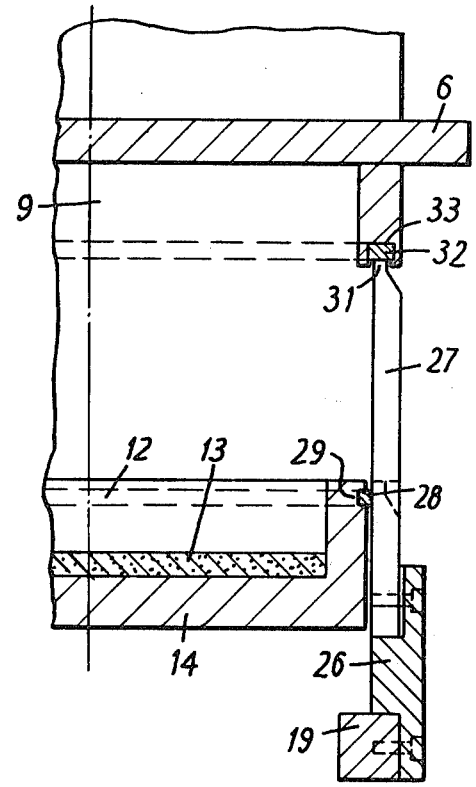

MOULDING MACHINE

This application is a continuation-in-part of Ser. No. 847,184 filed 31st Oct. 1977, now abandoned.

TECHNICAL FIELD

This invention relates to compression moulding presses and in particular to such presses capable of being used to mould materials which tend to release air and/or volatiles in gaseous or vapour form when subject to heat and pressure. For example, the compression moulding of rubbers and some thermoset resin materials is made difficult by virtue of air trapped in the mould and/or volatiles evolved in the vulcanising and or curing process.

BACKGROUND ART

Attempts to deal with trapped air and/or these volatile products of the moulding process by enclosing the moulding tool in a box constituted by sliding and pivoting sidewalls have been only moderately satisfactory, mainly due to their complexity and to premature failure of the necessary resilient seals.

Compression moulding presses are well-known in the moulding art and can be divided in very general terms into two classes, although their principle of operation is essentially the same. A rigid supporting framework incorporates a fixed platen and a moving platen which is displaceable towards and away from the fixed platen for example by means of a hydraulic ram or screw jack. The two platens are adapted to each carry one half of a moulding tool, the arrangement being such that displacement of the moving platen towards the fixed platen brings together the moulding tool halves so as to define a moulding cavity between them.

The moving platen is usually arranged to move in a vertical path; the means for displacing it relative to the fixed platen may be above the moving platen, in which case the press is of the downstroking class, or it may be below the moving platen, in which case the press is of the upstroking class. The present invention can be adapted to either class of press. Examples of upstroking presses are found in U.S. Pat. Nos. 3,997,286 and 2,542,874. Downstroking presses are generally similar, but have the platen means displacing at the top of the framework, the fixed platen being therefore in the position occupied by the main ram assembly shown in the two patents just referred to.

DISCLOSURE OF THE INVENTION

According to the present invention a compression moulding press has fixed and moving tool portions, a shroud mounted for sliding movement around and in sealing relation to one of said tool portions towards and into sealing engagement with the other tool portion so as to define with said tool portions a substantially closed chamber enclosing a moulding tool associated with said tool portions, together with actuating means operable to slide said shroud into said sealing engagement and means operable to at least partially evacuate said closed chamber when so defined.

The fixed and moving tool portions may be constituted by the fixed and moving halves of the tool itself, or they may be constituted by the fixed and moving platens on which the respective tool halves are received and supported. Both constructions are equally feasible and both will be particularly described later in relation to the drawings, although for simplicity the immediately following text refers only to the second construction, in which the fixed and moving tool portions are constituted by the fixed and moving platens, respectively. It follows that all references to "platens" should be read as including "tool halves", as appropriate.

Preferably, the shroud member is arranged to slide around the fixed platen, a continuous piston seal being provided around the lateral margin of the latter, the moving platen having a face seal disposed to meet the opposed face of the shroud. Conveniently, the shroud member is operated by a piston and cylinder device, for example, by at least one pneumatic or hydraulic ram, preferably of the double-acting kind. Advantageously, at least two rams are provided and disposed to apply pressure evenly around the periphery of the shroud. Where hydraulic rams are employed, they are preferably operated by the machine hydraulic system and it is preferred that their operation be controlled by the machine control system, particularly where the latter is programmable to operate the machine substantially automatically.

It will be understood that for a substantially closed chamber to be formed on sliding the shroud member both platens must be made impervious, for example, by blanking-off all the ejector holes not used for a particular tool. Of course, a vacuum connection must be provided and it is preferred that this be through one of the platens.

Because only two single seals are used, one of which is a butt or face seal and the other an enclosed seal of the sliding, piston kind, the risk of in use damage to either seal is minimal. Neither seal has to resist abrasion caused by engagement with sharp edges; the face seal in particular is easy to inspect for wear and to replace, if necessary.

Advantageously, at least one platen can be heated and it is preferred to use induction heating for this purpose because conventional cartridge heaters are unreliable, especially under vacuum. Induction heating is essentially independent of the atmosphere within the closed box. It has been found that leakage of air into the closed chamber through the holes used for connecting electrical power cables to the induction heating coils requires the holes to be provided with an air tight seal. Differential thermal expansion makes this difficult, but simple wrapping of the heating coils with a heat resistant fabric tape, such as asbestos, plus the use of mineral insulated cable connections through the platen with conventional compression fittings reduces air leakage to an entirely acceptable level. Preferably, the ends of the mineral insulated cable are sealed, for example, with melted glass, to prevent leakage into the porous insulation material within the cable sheath.

Because the shroud member slides independantly of and around one platen, it is possible to at least partly separate the moulding tool halves without opening the closed chamber. It is therefore possible to allow a moulding to "breath", i.e. to release evolved volatiles into the chamber; an at least partial vacuum developed in the chamber will facilitate this release.

DESCRIPTION OF PREFERRED EMBODIMENTS

Figure 1:
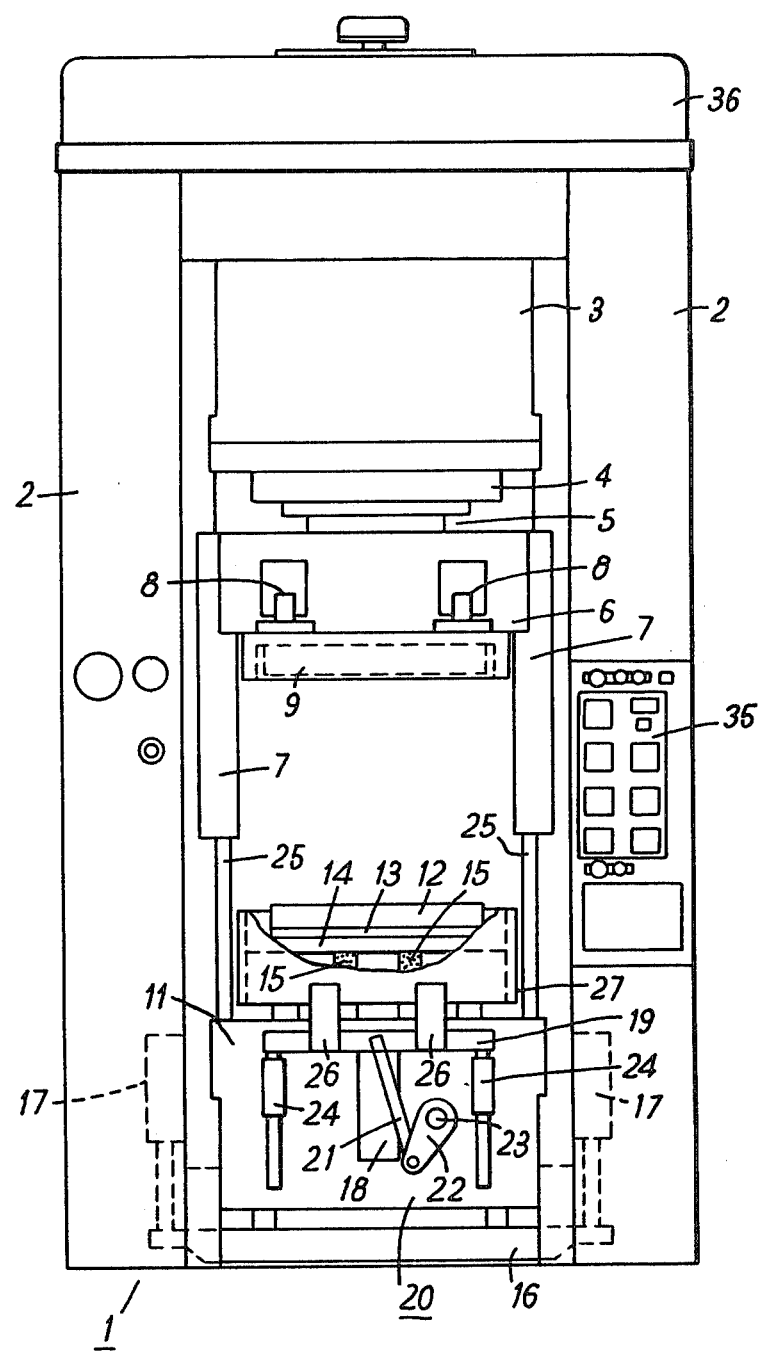
Figure 4:
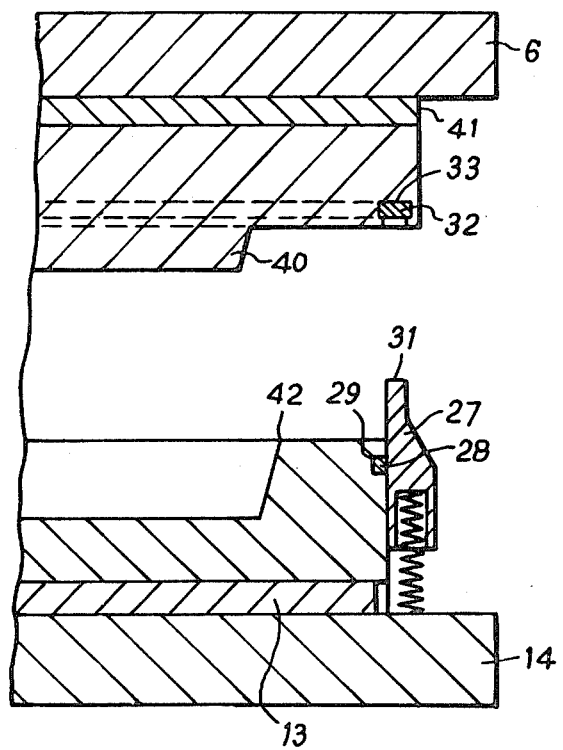

In order that the invention be better understood one preferred embodiment of it will now be described by way of example with reference to the accompanying drawings in which FIG. 1 is a schematic front view, partly in section, through a compression moulding press according to the invention, FIG. 2 is a side view of the press of FIG. 1, FIG. 3 is a fragmentary, partly sectional view of part of the press of FIG. 1, on an enlarged scale, and FIG. 4 is another fragmentary, partly sectional view of part of the press of FIG. 1, on an enlarged scale and showing a different embodiment of the invention.

In FIGS. 1 and 2, a base 1 supports main frame members 2 carrying between them at their upper end a cylinder frame 3 comprising a hydraulic cylinder 4 and a ram 5.

The ram 5 supports a moving platen 6 which is located at its edges by V-slides 7. Hinged to the underside of the platen 6 by hinges 8 is a tilting table 9 which in use carries half (the upper half) of a moulding tool (not shown). A hydraulic actuator and safety mechanism 10 (seen only in FIG. 2) is provided to tilt the table 9; this feature is used to facilitate stripping/cleaning the tool without an operative having to reach too far into the hot press. Stop blocks 25 are provided to limit the downward travel of the moving platen 6. These blocks extend upwardly from a lower support 11. Mounted below the moving platen 6 on the support 11 fixed to the base 1 is fixed platen comprising an assembly of an induction heated support 12, a layer of thermal insulation 13 and a bottom table 14, all of which stand on stool bars 15. Centrally of the press is a conventional ejector beam 16 operating ejectors (not shown) for the mouldings produced, the ejector beam being itself operated by ejector rams/cylinders 17.

Also within the lower part of the press are a pair of shroud member actuator cylinders 18 one only of which is seen in the figure. These are arranged to lift two members 19 which are linked together by a synchronising linkage 20 comprising arms 21, 22 and a shaft 23. The precise attitude of the members 19 is stabilised by guide bars/bushes 24 so that member 19 moves only in a controlled, essentially -vertical path. Supported by the members 19 through couplings 26 is a movable shroud member 27, as shown in operation in FIG. 3.

The shroud member completely surrounds the fixed platen and is constituted by a hollow box open at two opposite ends. Referring to FIG. 3, the shroud slides around the lateral rim of the bottom table 14 of the platen a circumferential piston seal 28 being provided in a recess 29 in said lateral rim of the bottom table. 14. As shown in FIG. 3, the shroud member is advanced to meet the upper, moving platen 6 and its upper rim 31 abuts against a face seal 32 set in a recess 33 in the face of this platen. Because both seals extend around the full circumference of the shroud member, the latter completely encloses the tool area 34, defining thereby a substantially closed chamber around the tool area. Furthermore closing the tool with the main ram 5 enhances the seal produced, since the main ram merely pushes the shroud downwardly with the moving platen against the force exerted by the shroud member actuator cylinder 18. It is also possible to at least partly open the tool without breaking the seal, because as long as the cylinder 18 is pressurised, the shroud member will simply follow the moving platen upwardly to the limit of its travel, as determined by the shroud member actuating mechanism described earlier.

It will be appreciated that the platens must be sensibly impervious and that a vacuum connection must be made through one of them, although this is not shown in the Figures. For example, the bottom table 14 of the fixed platen can be bored to received a vacuum pipe which communicates with the tool area through the insulation layer 13 and the induction heated support 12. Ancillary bores in the table 14 will be provided to accommodate power cables to the induction heating coils. These cables where they pass through the platen take the form of short lengths of mineral insulated, metal jacketed cable, installed using compression fittings to obtain a tight seal in the bores. The ends of the lengths of cable are sealed by flowing molten glass into them.

Because the press, apart from the shroud members and associated mechanism and seals is largely conventional, it will not be further described here, except to say that a normal electrical control unit 35 is fitted to operate the press substantially automatically through control of the press hydraulic system, which includes all the rams and associated parts and the oil reservoir 36 on top of the frame.

Whilst the foregoing description has been concerned with tool portions constituted by the fixed and moving platens, the invention can also be applied to the tool halves themselves, as is specifically shown in FIG. 4 and as was briefly discussed earlier. In this case, the shroud is arranged to slide around one of the tool halves, the piston seal being provided between it and the tool half in question. The face seal would then be on the other tool half.

Referring now to FIG. 4, it should be noted that where appropriate, like parts in FIGS. 3 and 4 have been given the same numerical designation. Thus, the moving platen 6 supports one half 40 of a moulding tool, a thermal insulation layer 41 being interposed between the tool and the platen to reduce the heating requirements of the tool. The tool half 40 is provided with a face seal 32 set in a recess 33 in the face of the tool. The fixed platen assembly includes a bottom table 14 which supports the other half 42 of the moulding tool through a layer of insulation material 13. In this case, the shroud 27 slides around the moulding tool half 42, a circumferential piston seal 28 being mounted in a recess 29 provided in the side edge of the tool half. The shroud 27 is urged towards the face seal 32 by a spring unit 43, so that in use with the tool closed, the edge 31 of the shroud is pressed firmly against the seal 32. It will be appreciated that the spring unit 43 serves only to load the seal 32 when the tool is closed; a pneumatic or hydraulic device could be used equally well for this purpose.

What I claim is:

1. In a compression moulding press having fixed and moving platen means for receiving and supporting the halves of a moulding tool therebetween, the improvement comprising a shroud member mounted for sliding movement around and in sealing relation to said fixed platen means towards and into sealing engagement with said moving platen means thereby to define with said platen means a substantially closed chamber enclosing said moulding tool, together with actuating means operable to slide said shroud, said fixed platen means having a continuous peripheral piston seal disposed thereon to effect said sealing relation and means operable to at least partially evacuate said closed chamber when so defined.

2. The compression moulding press of claim 1, wherein face sealing means are disposed on said moving platen means to sealingly abut against said shroud member when presented thereto.

3. The compression moulding press of claim 1, wherein said actuating means comprises a piston and cylinder device.

4. The compression moulding press of claim 1, wherein said actuating means comprises a double-acting hydraulic ram.

5. The compression moulding press of claim 1, including a plurality of said actuating means.

6. In compression moulding press having a fixed and a moving platen means for receiving and supporting the halves of a moulding tool therebetween, the improvement comprising a shroud member mounted for sliding movement around and in sealing relation to said fixed platen means towards and into sealing engagement with said moving platen means thereby to define with said platen means a substantially closed chamber enclosing said moulding tool, together with actuating means operable to slide said shroud, said fixed platen means having a continuous peripheral piston seal disposed thereon to effect said sealing relation, means operable to at least partially evacuate said closed chamber when so defined, and induction heating means associated with at least one of said platen means operable to heat at least one of said tool halves.

7. The compression moulding press of claim 6, wherein said induction heating means comprises an induction heating coil inside said at least one platen means and connectable to a source of electrical energy by cables passing through apertures defined in said one platen means, said cables being installed in sealing relation to said apertures so as to prevent undue leakage therethrough when said closed chamber is at least partly evacuated.

8. In a compression moulding press having fixed and moving platen means for receiving and supporting the halves of a moulding tool therebetween, the improvement comprising a shroud member mounted for sliding movement around and in sealing relation to one of said tool halves towards and into sealing engagement with the other of said tool halves thereby to define with said tool halves when closed together a substantially closed chamber enclosing said moulding tool, together with actuating means operable to slide said shroud, one of said tool halves having a continuous peripheral piston seal disposed thereon to effect said sealing relation and means operable to at least partially evacuate said closed chamber when so defined.

9. The compression moulding press of claim 8, wherein face sealing means are disposed on the other of said tool halves to sealingly abut against said shroud member when presented thereto.

10. The compression moulding press of claim 1, wherein said actuating means comprises a spring device.

11. The compression moulding press of claim 8, including a plurality of said actuating means.

12. In a compression moulding press having fixed and moving platen means for receiving and supporting the halves of a moulding tool therebetween, the improvement comprising a shroud member mounted for sliding movement around and in sealing relation to one of said tool halves towards and into sealing engagement with the other of said tool halves thereby to define with said tool halves when closed together a substantially closed chamber enclosing said moulding tool, together with actuating means operable to slide said shroud, one of said tool halves having a continuous peripheral piston seal disposed thereon to effect said sealing relation means operable to at least partially evacuate said closed chamber when so defined and induction heating means associated with at least one of said tool halves operable to heat said tool half.

13. The compression moulding press of claim 12, wherein said induction heating means comprises an induction heating coil inside said at least one tool half and connectable to a source of electrical energy by cables passing through apertures defined in said tool half, said cables being installed in sealing relation to said apertures so as to prevent undue leakage therethrough when said closed chamber is at least partly evacuated.

* * * * *